Sept. 3, 1963 O. HORNA 3,102,962

SHIFT REGISTER EQUIPPED WITH TUNNEL DIODES

Filed Nov. 15, 1961 4 Sheets-Sheet 1

INVENTOR.
Otakar Horna
BY
Richard Low
Agt

Sept. 3, 1963 O. HORNA 3,102,962

SHIFT REGISTER EQUIPPED WITH TUNNEL DIODES

Filed Nov. 15, 1961 4 Sheets-Sheet 2

INVENTOR.
Otakar Horna
BY
Richard Low
Agt

Sept. 3, 1963 O. HORNA 3,102,962

SHIFT REGISTER EQUIPPED WITH TUNNEL DIODES

Filed Nov. 15, 1961 4 Sheets-Sheet 3

INVENTOR.
Otakar Horna
BY Richard Low
Agt

Sept. 3, 1963 O. HORNA 3,102,962

SHIFT REGISTER EQUIPPED WITH TUNNEL DIODES

Filed Nov. 15, 1961 4 Sheets-Sheet 4

INVENTOR.
Otakar Horna
BY
Richard Low
Agt

United States Patent Office 3,102,962

Patented Sept. 3, 1963

3,102,962

SHIFT REGISTER EQUIPPED WITH TUNNEL DIODES

Otakar Horna, Prague, Czechoslovakia, assignor to Vyzkumny ustav matematickych stroju, Prague, Czechoslovakia Filed Nov. 15, 1961, Ser. No. 152,595
Claims priority, application Czechoslovakia Nov. 25, 1960
5 Claims. (Cl. 307—88.5)

The present invention relates to a shift register equipped with tunnel diodes and in particular to a register of the type suitable for operation in both directions as used in connection with mathematical machines. A register of this type forms, as a rule, a substantial part of arithmetical units or control units and the like. Tunnel diodes, sometimes termed "Esaki diodes,' are substantially two-pole semiconductor elements, in which a suitable concentration of impurities is intentionally produced at both sides of the pn-junction. This results in the following important effect. When the positive voltage is increased at the pn-junction, the plate current increases first up to a certain local maximum $I_p$. Upon a further increase of said positive voltage, however, the plate current starts to decrease until it reaches a local minimum $I_v$ and then with a continuously increasing positive voltage $V_d$ a further increase of the plate current takes place.

A tunnel diode therefore shows a negative resistance between the local maximum $I_p$ and the local minimum $I_v$. If the tunnel diode is series-connected with a plate resistance, which is higher than the negative resistance of the tunnel diode, the latter will have two stable states. These facts are well known in the art of tunnel diodes.

According to the present invention the shift register comprises a plurality of tunnel diode pairs, the common joints of said pairs being interconnected through resistances and a further resistance being connected to the common joint of each third pair, which latter resistance is connected to the respective input terminal, which serves for recording and reading of information deposited in the register.

The principle of the device, in respect of which a patent is applied for, is shown diagrammatically in the accompanying drawings, wherein.

Figure 1:
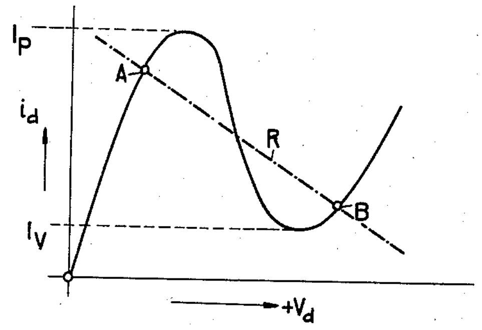
FIG. 1 shows the characteristic of a tunnel diode and the series-connected resistance.

In FIGURE 1, showing the characteristic of a tunnel diode, the plate resistance represented by a straight line R is higher than the negative resistance of the tunnel diode. The latter then has two stable states in points A and B. As said before, this phenomenon is well known in the art.

The basic element of the shift register according to the invention is a pair of tunnel diodes 1 and 2, 3 and 4, 5 and 6, further pairs 11 and 12, 13 and 14, 15 and 16 and, finally pairs 21 and 22, 23 and 24, 25 and 26 as well as a possible continuation 31 and 32 . . . . As evident from the diagram, three diode pairs at a time form a group. The tunnel diodes in each pair are series-connected in such a manner, that one diode (for example the diode 1) forms the load resistance of the other diode (for example the diode 2). Between all pairs of tunnel diodes connected in this way, there are interposed coupling resistances 8, 9, 10 or 18, 19, 20 or 28, 29, 30 or 38 . . . etc.

Input terminals 71, 171, 271, 371 . . . are provided between the individual groups of tunnel diodes, one suitable input resistance 7, 17, 27, 37 . . . etc. at a time being connected to each of the terminals.

D.C. feeding voltage $U_{DC}$ is applied across the terminal 65 and hence fed over a load resistance 61 on the one hand to the collector of a transistor 60, on the other hand over the feeding point 66 to all first tunnel diodes 1, 11, 21, 31 of each group. All second tunnel diodes 3, 13, 23 of each group are connected to a common feeding point 68. The third tunnel diodes 5, 15, 25 of each group are similarly connected to a common feeding point 67. All opposite tunnel diodes 2, 4, 6 or 12, 14, 16 or 22, 24, 26 or 32 . . . etc. of each group are grounded or connected to a common neutral wire.

The emitter of the transistor 60 is earthed, its base being connected to the output of the AND-gate 62. Applied to one input of this gate 62 are inverted pulses $\overline{U}_3$, its other input being connected to a terminal 74, to which shifting pulses $S_H$ are fed.

Connected in parallel to the feeding point 68 are two AND-gates 53 and 52. Further two AND-gates 51 and 50 are connected—likewise in parallel—to the feeding point 67.

One input of each gate 50, 51, 52 and 53 is connected to terminals 70, 78, 72 and 73 respectively. The other input of the gate 50 is connected to the terminal 73, the other input of the gate 51 to the terminal 72, the other input of the gate 52 to the terminal 70 and finally the other input of the gate 53 to the terminal 78.

The term "AND-gate" denotes a gate across the output terminals of which a voltage appears only if there is a voltage across both input terminals. Such a gate may comprise for example a multi-grid tube or suitably connected transistors or vacuum or semiconductor diodes or a suitable combination of any of said elements as is well known in the art of logical circuits for automatic computers.

The voltage pulse $U_1$ of the first phase is supplied to the terminal 73, the voltage pulse $U_2$ of the second phase to the terminal 72. Applied to the terminal 78 are pulses F inducing the contents of the register to be shifted forward. Pulses B initiating the displacement of the contents of the shift register in backward direction are applied to the terminal 70.

For the operation of the shift register according to the invention that pair of tunnel diodes is decisive, in which the diodes—as said above—are series-connected in such a manner that one diode forms the load resistance of the other diode. If the feed voltage and the characteristic of the tunnel diodes are suitably selected, it can be achieved that the aforesaid pair has two stable conditions: One tunnel diode operates within the region of a low plate voltage (state A), while the other tunnel diode operates with a high plate voltage (state B). Due to both diodes being series-connected, the current passing therethrough is equal. The selection of the diode which has to operate with low plate voltage (state A), while the other diode operates with a high plate voltage (state B) is effected by means of an auxiliary low current applied through the resistance (for example resistance 7) to the common junction of the pair of tunnel diodes (for instance 1 and 2). Said auxiliary current, of course, is applied prior to supplying the tunnel diodes with the three-phase feed voltage.

In accordance with the direction of the auxiliary current one of the diodes is triggered to the state B, after the feed voltage has been applied, while the other diode remains in the state A. These states are maintained regardless of whether the auxiliary current is then changed —provided, of course, that its value does not exceed a certain critical limit. This critical limit is usually far higher as to its order than the current which upon application of the feed voltage determines the aforementioned states of the tunnel diodes.

A numerical or logical significance can be allotted to these states, with the result that such a pair of tunnel diodes may be used as a basic member for the shift register according to the invention.

The wiring and arrangement of the shift register according to the invention enables the achievement of the following three operations:

(A) Recording the information into the shift register.

(B) Shifting in forward direction the register contents i.e. for instance increasing the order value of said contents.

(C) Shifting in backward direction the register contents, for instance reducing the order value of said contents.

Figure 2:
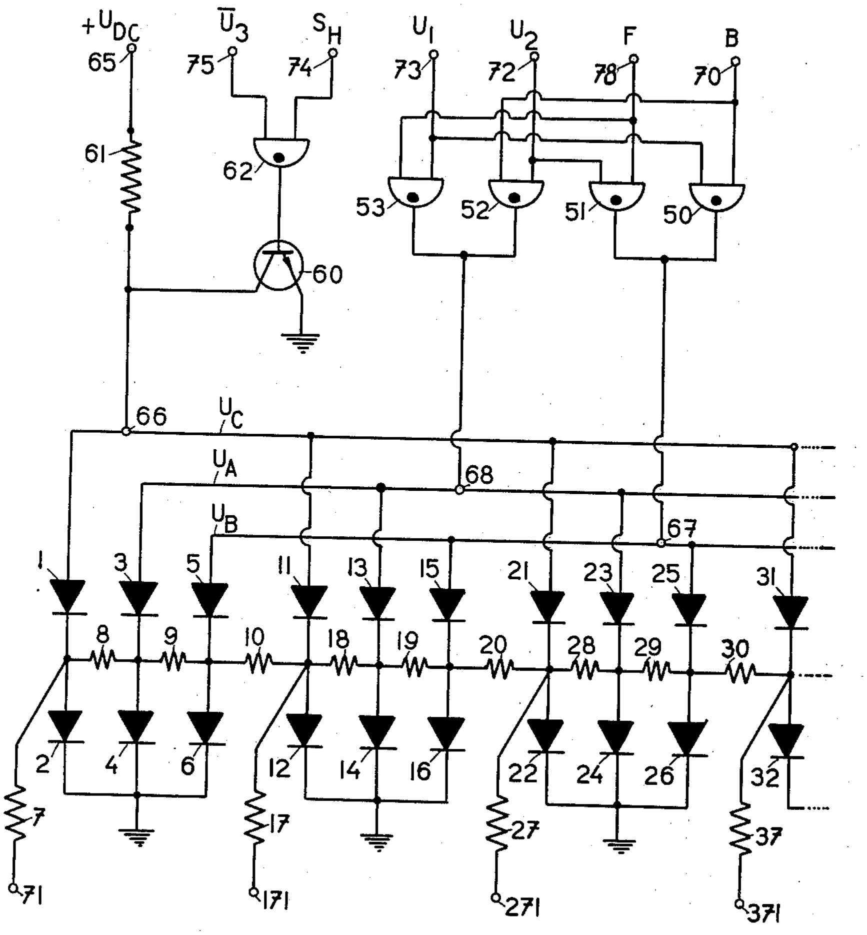
FIG. 2 shows the diagram of an exemplary embodiment of the invention, where feeding is effected by means of regularly alternating three-phase pulses.
Figure 3:
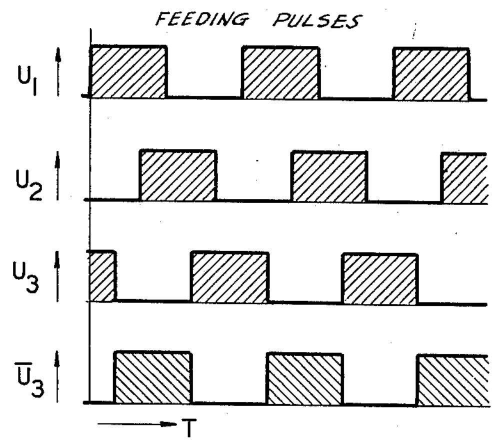
FIG. 3 shows a time-graph of such pulses marked $U_1$, $U_2$ and $U_3$ or pulses $\overline{U}_3$ produced by time-inversion of pulses $U_3$.

The apparatus shown in FIGURE 2 comprises two feeding sources, a source of D.C. voltage $U_{DC}$ and a source of uniformly distributed three-phase pulses $U_1$, $U_2$, $\overline{U}_3$. The above operations are accomplished in a manner hereinafter disclosed, by means of AND-gates 50, 51, 52, 53 and 62, in which the respective logical multiplication products are obtained.

When recording an information, the respective voltages, which constitute the carriers of said information, are applied to terminals 71, 171, 271, 371 . . . etc. A shifting pulse $S_H$ is applied to the gate 62 (which will be called "main gate"). This gate is thus opened and admits the inverted pulse $\overline{U}_3$ to the base of the transistor 60. The transistor is saturated for the duration of the inverted pulse $\overline{U}_3$ and, consequently, the D.C. voltage $U_C$ will disappear at the feeding point 66. As a result the so-called "preceding state" is cancelled in all first pairs of tunnel diodes 1 and 2, 11 and 12, 21 and 22, 31 and 32 in all groups of said diodes.

As soon as the inverted pulse $\overline{U}_3$ disappears, current ceases to pass through the transistor 60, the D.C. voltage reappearing in the feeding point 66, so that all above named first pairs of tunnel diodes are set to states corresponding to the voltages on terminals 71, 171, 271, 371 . . . etc. The recording of information is thus terminated and said first pairs of tunnel diodes remain in the state A or B. The information recorded in this way can be read on terminals 71, 171, 271, 371, where the values of the various voltages, in relation to the common grounding wire, will indicate the state A or B of the respective first pair of tunnel diodes in each group.

Figure 4:
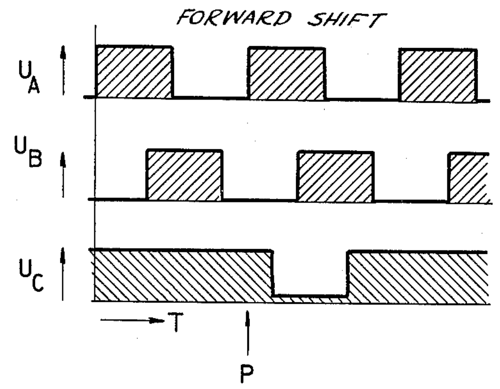
FIG. 4 shows the time-graph of pulses $U_A$ and $U_B$ beyond the gates as well as the voltage $U_C$ across the collector of a transistor upon arrival of a shifting pulse for shifting forward the contents of the register.

Forward shift of register contents: The pulses F serving for such a shift are applied to the terminal 78, while a shifting pulse $S_H$ is fed to the terminal 74, with the result that the gates 51 and 53, as well as the gate 62 are opened. Voltage pulses $U_A$, $U_B$ and $U_C$ then appear at the feeding points 68, 67 and 66 respectively. The time sequence of said pulses, which is decisive for the forward shift, is shown in FIGURE 4 of the drawings. The voltage pulse of the first phase of the pulsating feed voltage $U_A$ causes excitation of all second pairs of tunnel diodes 3 and 4, 13 and 14, 23 and 24 in such a manner that they are set to the same state as the first pair of tunnel diodes 1 and 2, 11 and 12, 21 and 22 etc. This means that the information is transferred through one step in forward direction over the coupling resistances 8, 18, 28 etc., i.e. to the right according to FIGURE 2. The voltage pulse of the second phase of the pulsating voltage $U_B$ causes excitation of all third pairs of tunnel diodes 5 and 6, 15 and 16, 25 and 26 so as to set them to the same states as the second pairs of tunnel diodes 3 and 4, 13 and 14, 23 and 24 respectively. This means that the information is transferred over the coupling resistances 9, 19, 29 through a further step forward, i.e. further to the right.

At the same time the inverted pulse $\overline{U}_3$ reaches the transistor 60, with the result that—as described above—such information as has been recorded originally in the first pairs of tunnel diodes 1 and 2, 11 and 12, 21 and 22, 31 and 32 etc. is cancelled. After the disappearance of the inverted pulse $\overline{U}_3$ said pairs of tunnel diodes 1 and 2 etc.—which are connected through resistances 10, 20, 30 etc. with the third pairs of tunnel diodes 5 and 6 etc.—are set to a state in which said third pairs of tunnel diodes were prior to the disappearance of the pulse $U_B$.

The information in question is thus transferred in three steps from the first pair of tunnel diodes 1 and 2 of the first group to the first pair of tunnel diodes 11 and 12 of the second group. Another information, recorded in the first pair of tunnel diodes 11 and 12 of the second group, is transferred simultaneously to the first pair of tunnel diodes 21 and 22 of the third group etc. Said transfers are effected in forward direction, i.e. to the right in FIGURE 2.

Figure 5:
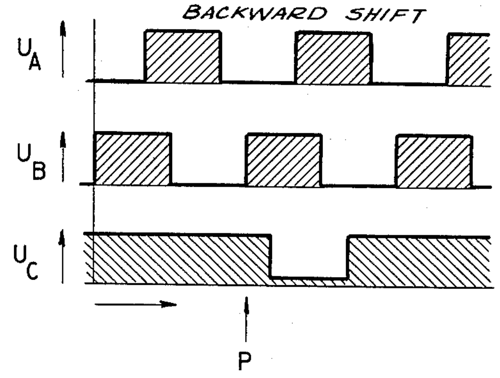
FIG. 5 shows a similar diagram but for shifting the contents of the register backwards.

Backward shift of register contents: Pulses B serving for this shift are applied to the terminal 70, a shifting pulse $S_H$ being fed to the terminal 74, with the result that the gates 50 and 52 as well as the gate 62 are opened. Analogously with the preceding example, voltage pulses $U_A$, $U_B$ and $U_C$ appear again in the feeding points 68, 67 and 66 respectively, but the time sequence of voltage pulses $U_A$ and $U_B$ is now reversed as compared with the time sequence for the forward shift, as shown in FIGURE 5. As a result, the information now proceeds in the register in opposite direction, i.e. from the right to the left.

The type of the transistor 60 is of no consequence for the operation of the shift register according to the invention. A transistor of the type N-P-N or, alternatively, a transistor of the type P-N-P may be used. According to a further modification of the invention an electron tube 80 can be used instead of the transistor 60, as shown in the detail of the device represented in FIGURE 6. Provided the values of the components used are chosen suitably, an important effect will be achieved: Upon arrival of a shifting pulse $S_H$ and inverted pulse $\overline{U}_3$, the transistor 60 (or the electron tube 80 replacing the same) becomes conductive, with the result that the voltage $U_C$ disappears at the feeding point 66 as well as on all first tunnel diodes 1, 11, 21, 31 . . . etc.

Figure 6:
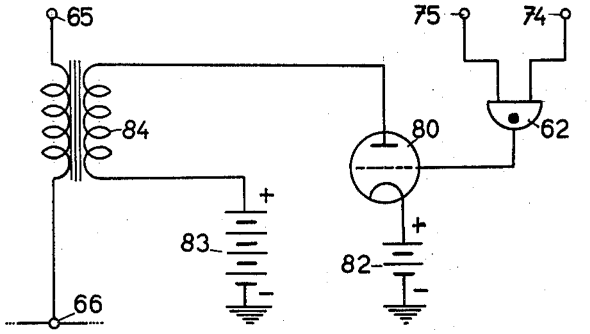
FIG. 6 is a diagram showing the connection with an electron tube in combination with a transformer coupling.
Figure 7:
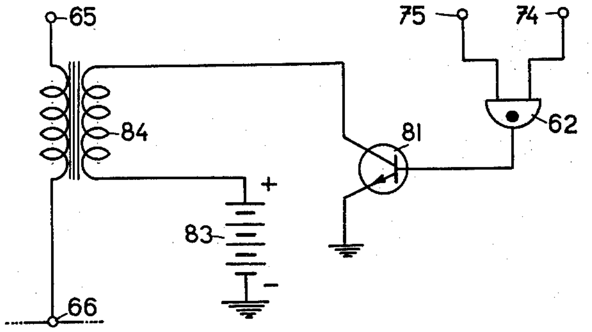
FIG. 7 shows the connection with a transistor in combination with a transformer coupling.

It lies within the framework of the present invention to replace the direct coupling over the resistance 61 by a transformer coupling as shown in FIGURES 6 and 7. In both cases a transformer 84 is used, one winding of which is connected between the input terminal 65 and the junction point 66. Its other winding is attached on the one hand to the positive pole of a battery 83 and, on the other hand, to the plate of an electron tube 80 or to a transistor 81. The cathode of said electron tube 80 is connected to the positive pole of a battery 82 and its grid to the AND-gate 62.

According to a modification of the invention disclosed in FIGURE 7, the base of the transistor 81 is connected to said AND-gate 62, the emitter of the transistor 81 being grounded.

Figure 8:
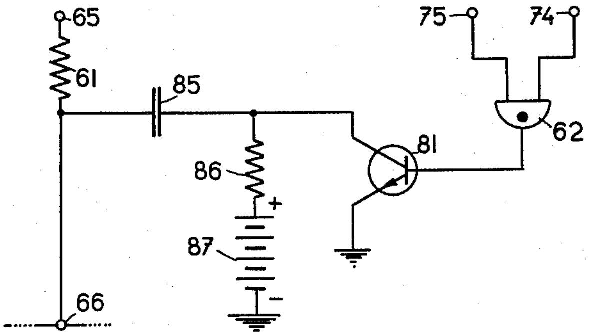
FIG. 8 represents a connection with a condenser coupling and with an input resistance.

FIGURE 8 shows a further modification of the invention, wherein a capacitor coupling in combination with an input resistance 61 is used, said resistance—similarly as in the embodiment according to FIGURE 2—being connected between the input terminal 65 and the junction point 66. The coupling capacitor 85 is inserted between the input resistance 61 and the collector of the transistor 81, whose emitter is earthed and whose base is again connected to the output of the AND-gate 62. Connected to the collector of said transistor 81 through an interposed resistance 86 is further the positive pole of a battery 87.

Figure 9:
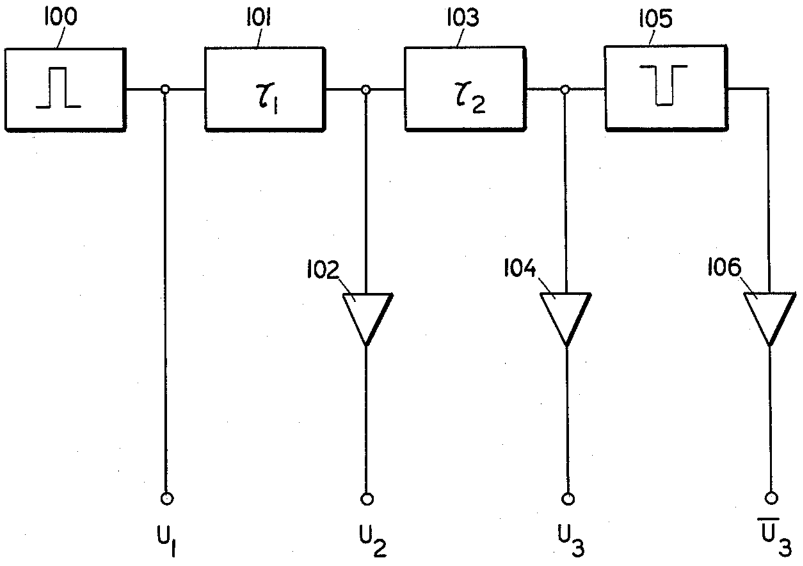
FIG. 9 shows an example of a three-phase generator.

A source of three-phase pulses for feeding the various gates can be designed in different ways, which are well known in the art of pulse circuits. One of the possible arrangements is shown in FIGURE 9 of the drawings. The device comprises a pulse generator 100, which may be connected as a blocking oscillator, free running multivibrator or sine-wave oscillator with suitable shaping circuits equipped either with vacuum tubes or various semi-conductors, such as transistors, trigistors, etc.

From the output of the generator the pulse voltage $U_1$ is taken off directly. This voltage is delayed in a delay-line 101 by the required time $T=\tau_1$ and applied to an amplifier 102 provided, if necessary, with a suitable shaping circuit. From the output of the amplifier 102 the pulse voltage $U_2$ is taken off.

The pulse $U_3$ is produced in the same way by a delay in the delay line 103 and amplification in an amplifier 104. By inverting the output voltage from the delay line 103 in an inverter 105 and amplification of said inverted voltage in an amplifier 106 the pulse $\overline{U}_3$ is obtained. It is obvious that the inverter 105 and the amplifiers 102, 104 and 106 can be equipped with vacuum tubes or semi-conductors. It is further irrelevant whether the delay lines 101 and 103 are formed by means of four-poles with distributed or lumped circuits. All the aforesaid connections are well known and used in pulse circuits.

What I claim is:

1. A shift register capable of being forward shifted and backward shifted, comprising in combination: a plurality of tunnel diode pairs, each pair including two tunnel diodes connected in series-aiding, each pair having a first and second end, and a common junction point between said two tunnel diodes, a plurality of groups of said tunnel diode pairs, each comprising a first, a second, and a third tunnel diode pair, a source of three-phase feeding pulses uniformly distributed in relation to time, a source of shifting pulses, a source of time-inverted pulses derived from the third phase of said feeding pulses, a source of pulses for the control of forward shifting, a source of pulses for the control of backward shifting, five AND gates, each having two inputs and one output, a second feeding point, means connecting the outputs of the first and second ones of said AND gates to said second feeding point, a third feeding point, means connecting the outputs of the third and fourth ones of said AND gates to said third feeding point, a source of constant direct current voltage, a first feeding point, means including a load resistor connecting said source of direct current voltage to said first feeding point, interposed coupling resistors respectively interconnecting the common junction points between said pairs of tunnel diodes, a plurality of input terminals, each terminal being connected to the common junction of the first tunnel diode pair of a particular group through a respective input resistor, said input terminals being adapted to serve as both recording and reading points for said shift register, means connecting said first end of the first pair of tunnel diodes of each of said groups to said first feeding point, means connecting said first end of the second pair of tunnel diodes of each of said groups to said second feeding point, means connecting said first end of the third pair of tunnel diodes of each of said groups to said third feeding point, means connecting said second ends of all tunnel diode pairs to a point of reference potential, means connected to the output of the fifth one of said AND gates for controlling the supply of said constant direct current voltage to said first feeding point, means connecting said source of shifting pulses to one of the inputs of said fifth gate and connecting said source of time-inverted pulses to the other of the inputs of said fifth gate, means for supplying to one of the two inputs of each of said first and fourth AND gates the first phase of said three-phase feeding pulses, means for supplying to one of the two inputs of each of said second and third AND gates the second phase of said three-phase feeding pulses, means for applying the pulses for control of said forward shifting to the other of the two inputs of each of said first and third AND gates, and means for applying the pulses for control of said backward shifting to the other of the two inputs of each of said second and fourth AND gates.

2. A shift register as in claim 1, wherein said means for controlling the supply of said constant direct current voltage comprises a transistor including a collector electrode connected to said first feeding point, a base electrode connected to said output of said fifth gate, and an emitter electrode connected to a point of reference potential.

3. A shift register as in claim 1, wherein said means for controlling the supply of said constant direct current voltage comprises an electron tube having a grid electrode, a cathode electrode and a plate electrode, said means further including a coupling transformer having a first and second winding, means connecting said plate and cathode electrode of said electron tube to the respective ends of said first winding, means connecting one end of said second winding to said source of direct current voltage, and the second end of said second winding to said first feeding point, and means connecting said grid electrode to the output of said fifth gate.

4. A shift register as in claim 1, wherein said means for controlling the supply of said constant direct current voltage comprises a transistor including a collector electrode and an emitter electrode, a coupling transformer having a first and second winding, means connecting said collector and emitter electrodes to the respective ends of said first winding, means connecting one end of said second winding to said source of direct current voltage, and the other end of said second winding to said first feeding point, said transistor also including a base electrode, and means connecting said base electrode to the output of said fifth gate.

5. A shift register as in claim 1, wherein said means for controlling the supply of said constant direct current voltage comprises a transistor including a collector electrode and an emitter electrode, means including a collector load resistor and a separate source of collector voltage connected between said collector and emitter electrodes, means including a coupling capacitor connecting said collector electrode to said first feeding point, said transistor further including a base electrode, and means connecting said base electrode to the output of said fifth gate.

References Cited in the file of this patent

IBM Technical Disclosure Bulletin, vol. 2, No. 6, April 1960, "RC Coupled Tunnel Diode Shift Register," A. J. Gruodis.